(12) United States Patent
Kutsuna et al.

(10) Patent No.: US 12,490,683 B2
(45) Date of Patent: Dec. 9, 2025

(54) GARDENING TRIMMER

(71) Applicant: MAKITA CORPORATION, Anjo (JP)

(72) Inventors: Tomoyuki Kutsuna, Anjo (JP); Mikihiro Kitahara, Anjo (JP)

(73) Assignee: MAKITA CORPORATION, Anjo (JP)

( * ) Notice: Subject to any disclaimer, the term of this patent is extended or adjusted under 35 U.S.C. 154(b) by 808 days.

(21) Appl. No.: 17/706,927

(22) Filed: Mar. 29, 2022

(65) Prior Publication Data

US 2022/0312681 A1 Oct. 6, 2022

(30) Foreign Application Priority Data

Mar. 30, 2021 (JP) ................... 2021-057660

(51) Int. Cl.
*A01G 3/04* (2006.01)
*A01G 3/037* (2006.01)

(52) U.S. Cl.
CPC .............. *A01G 3/04* (2013.01); *A01G 3/037* (2013.01)

(58) Field of Classification Search
CPC ......... A01G 3/053; A01G 3/04; A01G 3/0475
USPC ........................... 30/216, 223, 215, 224, 208
See application file for complete search history.

(56) References Cited

U.S. PATENT DOCUMENTS 5,689,887 A * 11/1997 Heywood .............. A01G 3/053
30/220
2010/0146796 A1* 6/2010 Geromiller ............ A01G 3/053
30/223
2012/0151778 A1 6/2012 Svennung

FOREIGN PATENT DOCUMENTS

| CN | 106912301 A | * | 7/2017 | |
|---|---|---|---|---|
| CN | 206611827 U | * | 11/2017 | ............. A01G 3/053 |
| JP | 2005-006534 A | | 1/2005 | |
| WO | WO-9521521 A1 | * | 8/1995 | ............. A01G 3/053 |
| WO | WO-2021024579 A1 | * | 2/2021 | ............. A01D 34/10 |

OTHER PUBLICATIONS

Communication dated Aug. 20, 2024, issued in Japanese Application No. 2021-057660.
Communication dated Mar. 31, 2025, issued in Chinese Application No. 202210300362.7.
Chinese Office Action dated Jul. 6, 2025, issued in Chinese application No. 202210300362.7.

* cited by examiner

*Primary Examiner* — Jennifer S Matthews
(74) *Attorney, Agent, or Firm* — Sughrue Mion, PLLC

(57) ABSTRACT

A gardening trimmer may include: a first blade; a facing member overlapping with the first blade in a second direction perpendicular to a first direction; and a suppressing structure. Grease may be applied to at least a part of a conversion mechanism. The first blade may include: a plurality of first slots; and a plurality of pairs of first connecting portions, wherein each pair of the first connecting portions is disposed at opposite ends of corresponding one of the first slots in a third direction perpendicular to the first and second directions. The suppressing structure may be configured to suppress the grease from moving toward a front end of the first blade in the first direction. The suppressing structure may be disposed on the facing member at a position facing at least one pair of in the second direction when the first blade reciprocates relative to the facing member.

9 Claims, 11 Drawing Sheets

GARDENING TRIMMER

CROSS-REFERENCE TO RELATED APPLICATION

This application claims priority to Japanese Patent Application No. 2021-57660 filed on Mar. 30, 2021, the entire contents of which are hereby incorporated by reference into the present application.

TECHNICAL FIELD

This disclosure herewith relates to a gardening trimmer.

BACKGROUND

Japanese Patent Application No. 2003-172892 (Japanese Patent Application Publication No. 2005-006534) describes a gardening trimmer. The gardening trimmer comprises a prime mover; a conversion mechanism configured to convert a rotational movement of the prime mover to a reciprocating movement along a first direction; a first blade connected to the conversion mechanism; and a facing member overlapping with the first blade in a second direction perpendicular to the first direction. The first blade is configured to reciprocate relative to the facing member along the first direction in conjunction with an operation of the conversion mechanism. Grease is applied to at least a part of the conversion mechanism. The first blade includes: a plurality of first slots disposed along the first direction; and a plurality of pairs of first connecting portions, in which each pair of the first connecting portions is disposed at opposite ends of corresponding one of the first slots in a third direction perpendicular to both the first direction and the second direction.

SUMMARY

In the gardening trimmer as described above, since the facing member overlaps with the first blade in the second direction, a minute gap is disposed between the facing member and the first blade. When the first blade reciprocates relative to the facing member, the grease applied to the conversion mechanism enters the minute gap between the facing member and the first blade due to capillary action, and moves toward a front end of the first blade. Sliding resistance related to reciprocating movement of the first blade is increased. The present disclosure provides a technique that can reduce sliding resistance related to reciprocating movement of a blade.

The present disclosure discloses a gardening trimmer. The gardening trimmer comprises: a prime mover; a conversion mechanism configured to convert a rotational movement of the prime mover to a reciprocating movement along a first direction; a first blade connected to the conversion mechanism; and a facing member overlapping with the first blade in a second direction perpendicular to the first direction. The first blade is configured to reciprocate relative to the facing member along the first direction in conjunction with operation of the conversion mechanism. Grease is applied to at least a part of the conversion mechanism. The first blade includes: a plurality of first slots disposed along the first direction; and a plurality of pairs of first connecting portions, wherein each pair of the first connecting portions is disposed at opposite ends of corresponding one of the first slots in a third direction perpendicular to both the first direction and the second direction. The gardening trimmer further comprises a suppressing structure configured to suppress the grease from moving toward a front end of the first blade in the first direction. The suppressing structure is disposed on the facing member at a position facing at least one pair of the first connecting portions in the second direction when the first blade moves in the reciprocating manner relative to the facing member.

In conjunction with the reciprocating movement of the first blade, when the grease enters and attempts to move through a minute gap between the first blade and the facing member due to capillary action, the grease needs to move on the first connecting portions. In the above configuration, the suppressing structure is disposed at the position facing at least one pair of the first connecting portions when the first blade reciprocates relative to the facing member. Therefore, even when the grease attempts to move on the first connecting portions due to capillary action, the grease cannot move any further toward the front end of the first blade after it arrives at the position of the suppressing structure. Therefore, the grease will not be disposed in the minute gap on the front end side of the first blade. Consequently, increase in sliding resistance related to reciprocating movement of the first blade can be suppressed.

DETAILED DESCRIPTION

Figure 1:
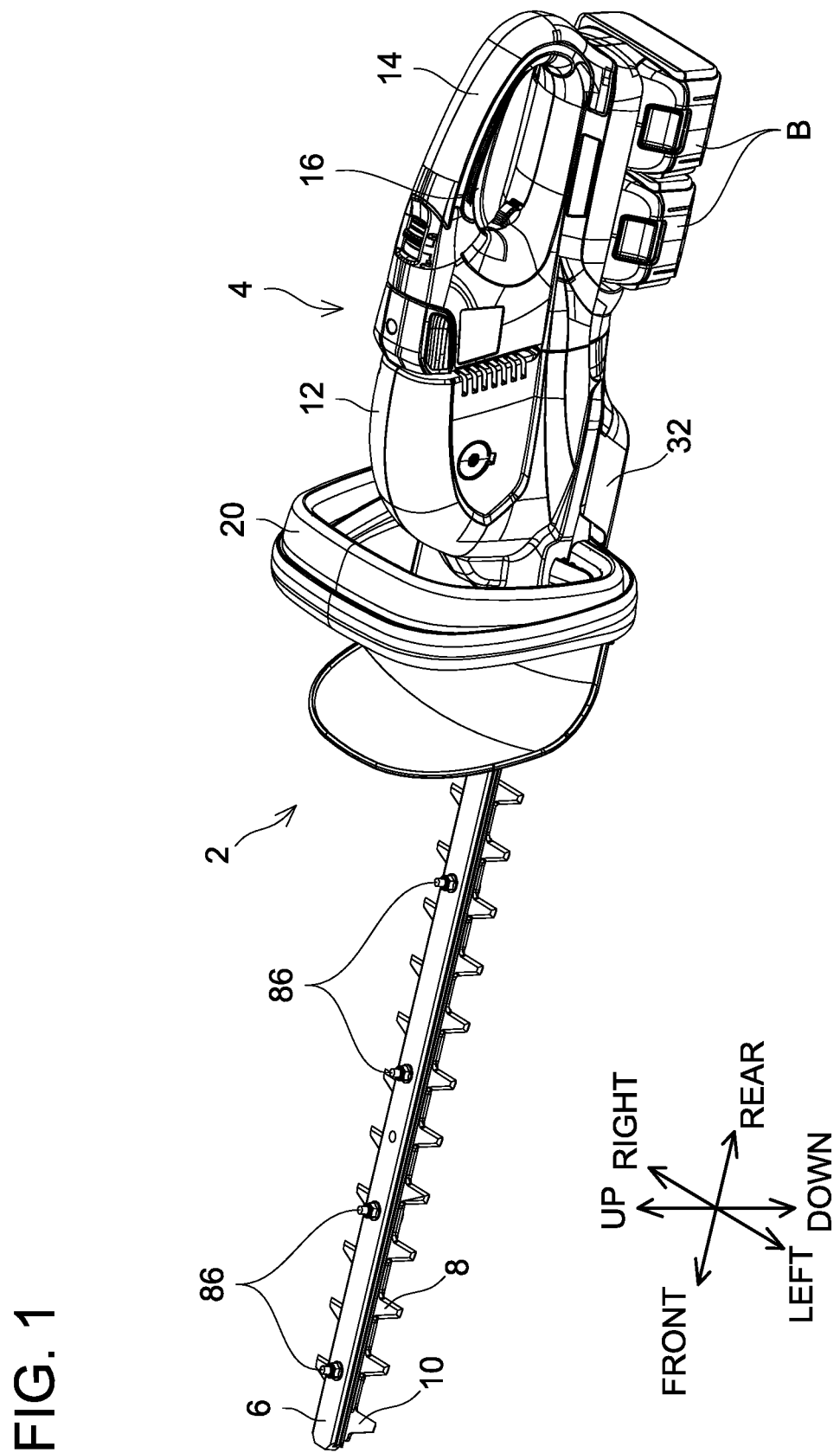
FIG. 1 illustrates a perspective view of a gardening trimmer 2 of a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved gardening trimmers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the suppressing structure is disposed on the facing member at a position facing, in the second direction, one pair of the plurality of first connecting portions closest to a rear end of the first blade in the first direction when the first blade reciprocates relative to the facing member.

In the above configuration, at the position closest to the rear end of the first blade, the grease can be suppressed from moving toward the front end of the first blade from the position. Consequently, an amount of the grease disposed in a minute gap between the first blade and the facing member can be reduced. As a result, increase in sliding resistance related to the reciprocating movement of the first blade can be suppressed.

In one or more embodiments, the suppressing structure further comprises a cutout defined inward from an outer edge of the facing member in the third direction and penetrating the facing member in the second direction.

In the above configuration, since the cutout is defined in the facing member, the facing member includes a portion that does not face the first connecting portion(s) in the second direction. Consequently, the grease cannot move on the first connecting portion(s) toward the front end of the first blade. As a result, by a simple configuration with the cutout defined in the facing member, increase in sliding resistance related to the reciprocating movement of the first blade can be suppressed.

In one or more embodiments, the suppressing structure further comprises a groove disposed on a surface of the facing member that faces the first blade, the groove being recessed inward in the second direction from the surface.

In the above configuration, since the groove is defined in the facing member, a distance between a bottom surface of the groove and a surface of the first blade is greater than a height of the minute gap between the facing member and the first blade. Consequently, capillary action tends not to occur between the bottom surface of the groove and the surface of the first blade. As a result, by a simple configuration with the groove defined in the facing member, increase in the sliding resistance related to the reciprocating movement of the first blade can be suppressed.

In one or more embodiments, the suppressing structure is further disposed on a surface of the first blade facing the facing member.

In the above configuration, the grease can be suppressed from moving toward the front end of the first blade by using both the suppressing structure disposed on the facing member and the suppressing structure disposed on the first blade. As a result, increase in the sliding resistance related to the reciprocating movement of the first blade can further be suppressed.

In one or more embodiments, the suppressing structure may be disposed on a portion of the first blade other than the first connecting portions.

Since the first connecting portions are disposed at opposite ends of the first slots in the second direction, rigidity of the first connecting portion of the first blade with respect to the first direction is lower than rigidity of the portion of the first blade other than the first connecting portions. Therefore, when the suppressing structure is disposed on the first connecting portions, the first blade may easily break at the first connecting portions. With the above configuration, since the suppressing structure is disposed on the portion of the first blade other than the first connecting portions, breakage of the first blade at the first connecting portions can be suppressed as compared to the case in which the suppressing structure is disposed on the first connecting portions.

In one or more embodiments, the facing member may comprise a plate member configured to reduce sliding resistance applied by reciprocating movement of the first blade.

In the above configuration, since the suppressing structure is disposed on the plate member, the sliding resistance of the first blade can be suppressed, and the grease can be suppressed from moving toward the front end of the first blade.

In one or more embodiments, the gardening trimmer may further comprise a plate member overlapping with the first blade in the second direction. The facing member may comprise a second blade. The first blade and the second blade may be configured to reciprocate relative to the plate member along the first direction in conjunction with the operation of the conversion mechanism.

In the above configuration, the grease can be suppressed from moving through the minute gap between the first blade and the second blade and moving toward the front ends of the first blade and the second blade. Consequently, increase in the sliding resistance related to the reciprocating movements of the first blade and second blade can be suppressed.

In one or more embodiments, the first blade may include a plurality of first blade edges disposed on opposite outer edges in the third direction.

In the above configuration, as compared to the case in which the first blade edges are disposed only on one outer edge of the first blade in the third direction, maneuverability of the gardening trimmer can be enhanced.

In one or more embodiments, the prime mover may comprise an electric motor.

In the above configuration, as compared to the case in which the prime mover is an engine, vibration generated upon operation of the gardening trimmer can be suppressed.

First Embodiment

With reference to FIGS. 1 to 8, a gardening trimmer 2 of a first embodiment will be described. The gardening trimmer 2 is a gardening tool mainly used to trim hedges and plants, and is also referred to as a hedge trimmer. As illustrated in FIG. 1, the gardening trimmer 2 comprises a body 4, a guide bar 6, an upper blade 8 and a lower blade 10. Hereafter, the longitudinal direction of the guide bar 6, the upper blade 8, and the lower blade 10 is referred to as a front-rear direction, a direction orthogonal to the front-rear direction is referred to as an up-down direction, and a direction orthogonal to the front-rear direction and the up-down direction is referred to as a left-right direction.

As illustrated in FIG. 1, the body 4 comprises a housing 12 and a front handle 20. A rear handle 14 for a worker to grip with his/her hand is disposed on an upper rear portion of the housing 12. A trigger switch 16 for the worker to manipulate operations of the upper blade 8 and the lower blade 10 is disposed on the rear handle 14. Battery packs B are detachably attached to a lower rear portion of the housing 12. In other words, the gardening trimmer 2 of the present embodiment is a cordless electric power tool of which power source is the battery packs B. In a variant, the gardening trimmer 2 may be an electric power tool connected to an external AC power source or an external DC power source via a cable, or may be engine-driven power tool.

The front handle 20 is disposed on a front portion of the housing 12. The worker grips the rear handle 14 with his/her one hand and grips the front handle 20 with the other hand to handle the gardening trimmer 2.

Figure 2:
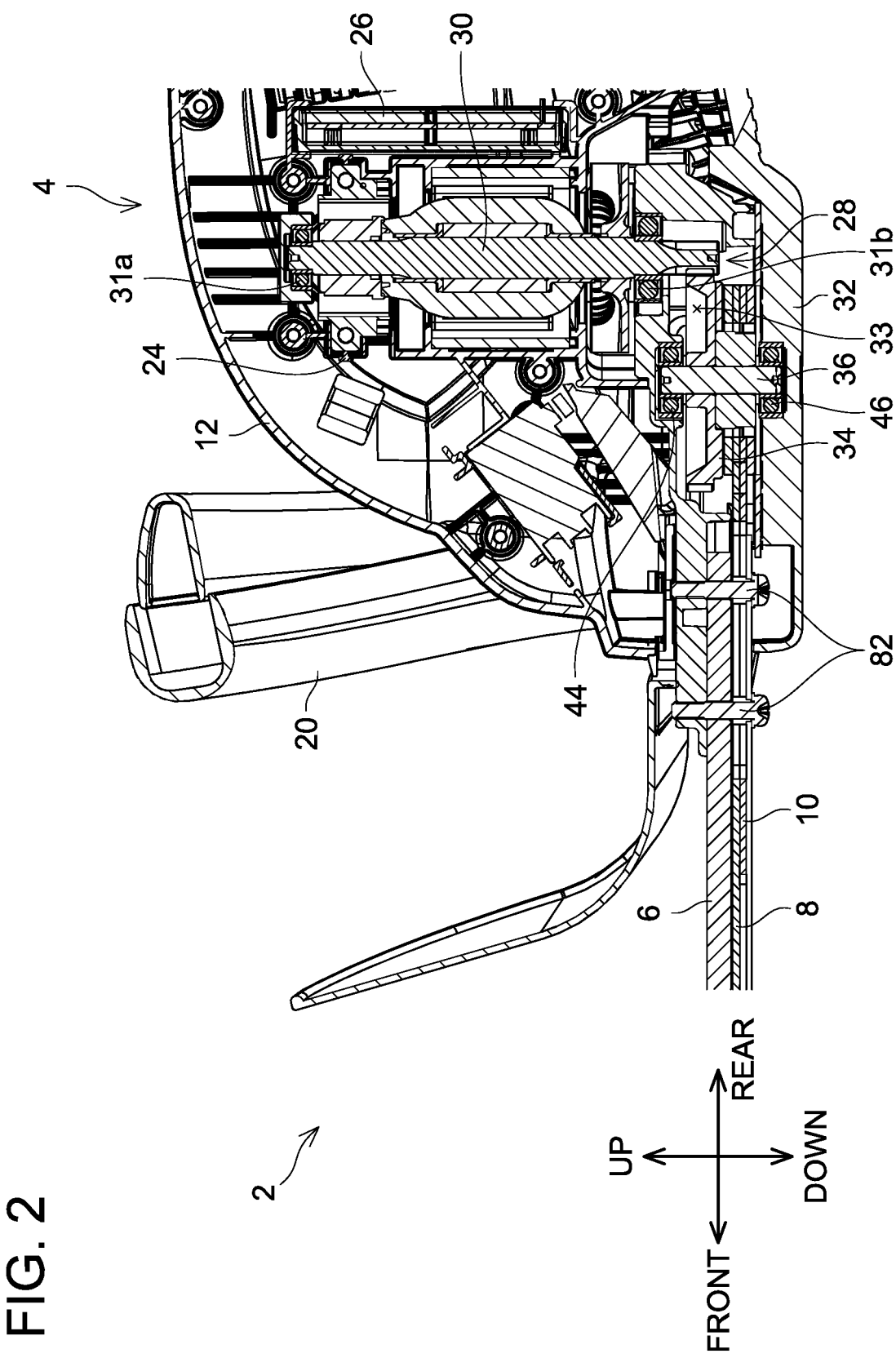
FIG. 2 illustrates a cross-sectional view of a front portion of the gardening trimmer 2 of the first embodiment.

As illustrated in FIG. 2, the body 4 comprises an electric motor 24, a control unit 26 and a conversion mechanism 28. The electric motor 24 and the control unit 26 are disposed within the housing 12. The electric motor 24 is a motor with a DC brush. In a variant, the electric motor 24 may be an AC motor or a brushless motor. The electric motor 24 operates by being controlled by the control unit 26. A gear is disposed at the lower end of a motor shaft 30 of the electric motor 24. The motor shaft 30 is rotatably supported by the housing 12 via bearings 31a, 31b. When the electric motor 24 operates, the motor shaft 30 rotates. In accordance with a manipulation amount of the trigger switch 16, the control unit 26 controls an operation amount of the electric motor 24 (i.e., rotation speed of the motor shaft 30).

Figure 3:
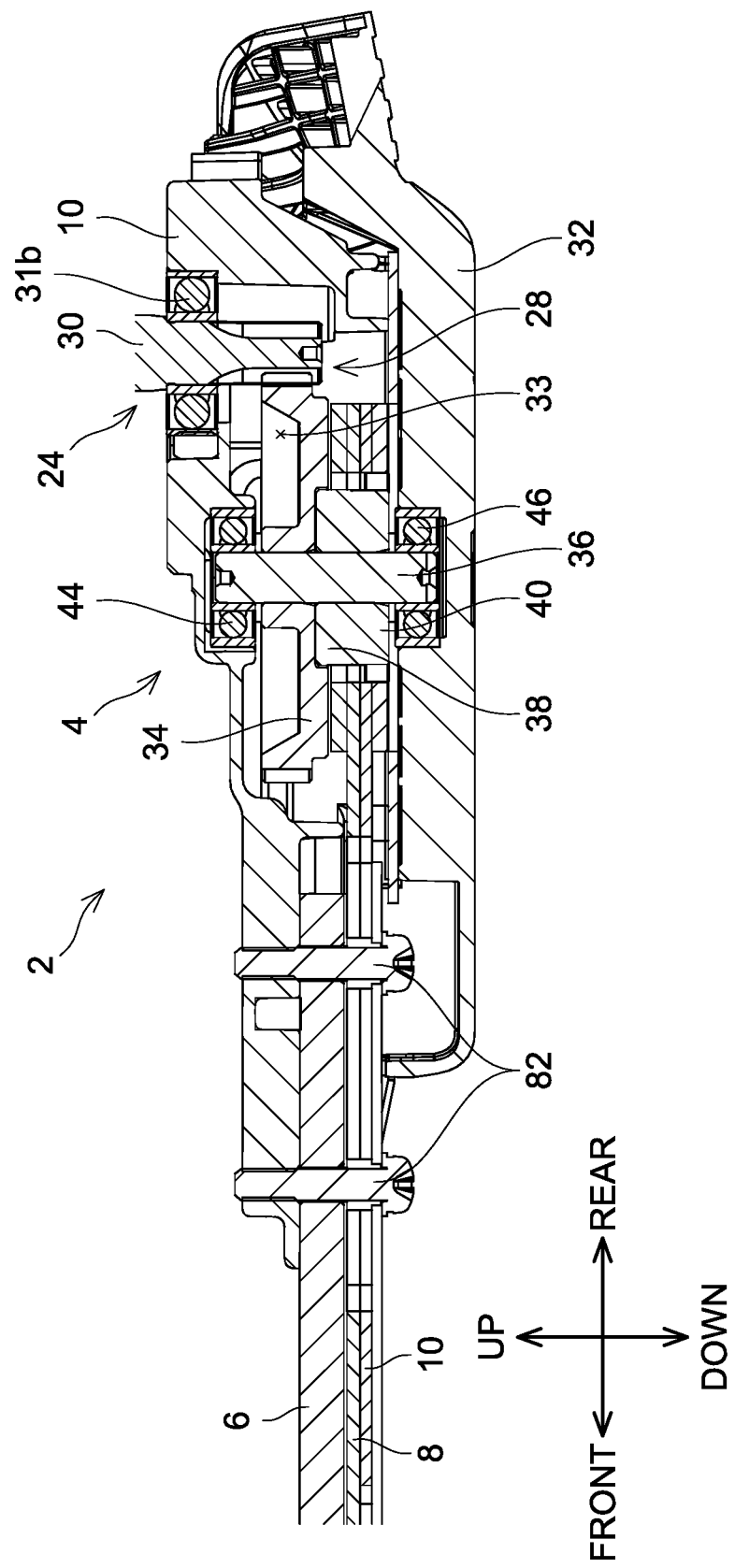
FIG. 3 illustrates an enlarged view of a conversion mechanism 28 and its vicinity in FIG. 2.

As illustrated in FIG. 3, the conversion mechanism 28 is covered by a cover member 32 from below. Therefore, the conversion mechanism 28 is disposed in a housing space 33 between the housing 12 and the cover member 32. The conversion mechanism 28 is configured to convert a rotational movement of the motor shaft 30 to reciprocating movements of the upper blade 8 and the lower blade 10 along the front-rear direction. The front-rear direction is equal to the direction in which the upper blade 8 and the lower blade 10 reciprocate. The conversion mechanism 28 comprises a reduction gear 34, a center shaft 36, an upper disk 38 (see FIG. 4) and a lower disk 40 (see FIG. 4). The reduction gear 34 is meshed with the gear at the lower end of the motor shaft 30. The reduction gear 34 rotates at a rotation speed lower than a rotation speed of the motor shaft 30. The center shaft 36 is fixed to the reduction gear 34. The center shaft 36 is rotatably supported by the housing 12 and the cover member 32 via bearings 44, 46.

Figure 4:
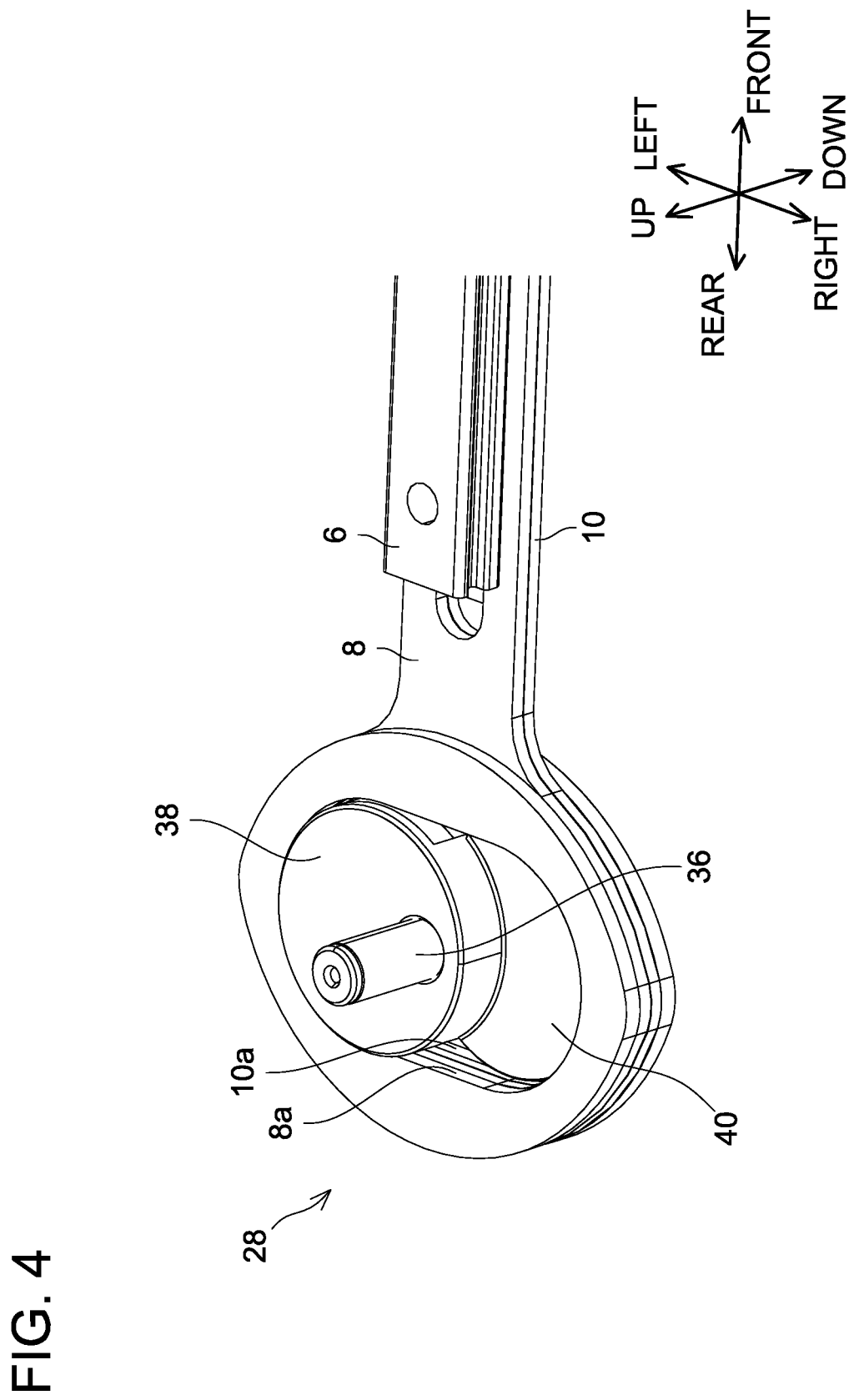
FIG. 4 illustrates perspective views of a center shaft 36, an upper disk 38, and a lower disk 40 of the conversion mechanism 28 of the first embodiment.

The upper disk 38 and the lower disk 40 are fixed to the center shaft 36. The upper disk 38 and the lower disk 40 are integrated. As illustrated in FIG. 4, the upper disk 38 and the lower disk 40 have circular shapes. The center of the circle of the upper disk 38 and the center of the circle of the lower disk 40 are positioned away from the center shaft 36. Around the center shaft 36, the center of the circle of the upper disk 38 have an interval of 180 degrees relative to the center of the circle of the lower disk 40. The upper disk 38 is disposed in an upper opening 8a defined at the rear end of the upper blade 8, and the lower disk 40 is disposed in a lower opening 10a defined at the rear end of the lower blade 10. Each of the upper opening 8a and the lower opening 10a has its longitudinal direction in the left-right direction.

When the center shaft 36 rotates, the upper disk 38 and the lower disk 40 rotate about the center axis of the center shaft 36. The upper disk 38 rotates while being in contact with the inner surface of the upper opening 8a. When the upper disk 38 rotates and moves forward, the upper blade 8 is pushed forward. When the upper disk 38 rotates and moves rearward, the upper blade 8 is pushed rearward. Consequently, the upper blade 8 reciprocates in the front-rear direction. The lower disk 40 rotates while being in contact with the inner surface of the lower opening 10a. When the lower disk 40 rotates and moves forward, the lower blade 10 is pushed forward. When the lower disk 40 rotates and moves rearward, the lower blade 10 is pushed rearward. Consequently, the lower blade 10 reciprocates in the front-rear direction. The upper blade 8 and the lower blade 10 reciprocate in phases opposite to each other. In a variant, one of the upper blade 8 and the lower blade 10 alone may reciprocate in the front-rear direction.

Grease is applied to the reduction gear 34, the center shaft 36, the upper disk 38, and the lower disk 40. The grease suppresses the center shaft 36, the upper disk 38 and the lower disk from becoming worn due to operation of the conversion mechanism 28.

Figure 5:
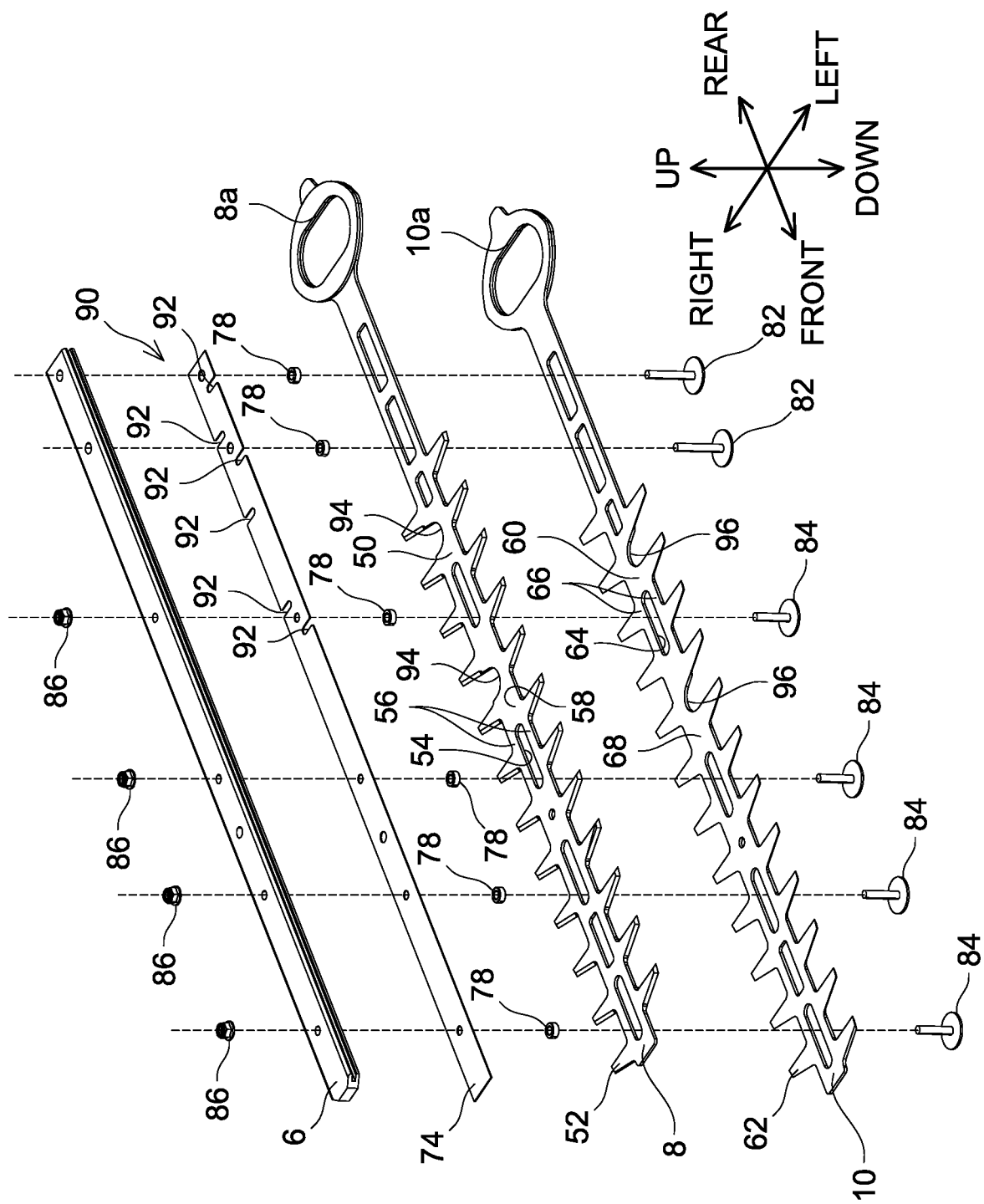
FIG. 5 illustrates exploded perspective views of a guide bar 6, a sliding plate 74, guide members 78, an upper blade 8, and a lower blade 10 of the first embodiment.

As illustrated in FIG. 5, the upper blade 8 comprises an upper base 50 and a plurality of upper blade edges 52. The upper base 50 extends in the front-rear direction. The plurality of upper blade edges 52 extend outward from both the right and left edges of the upper base 50. The upper base 50 includes a plurality of upper slots 54 and a plurality of pairs of upper connecting portions 56 each of which is disposed at opposite ends of corresponding one of the upper slots 54 in the left-right direction. The plurality of upper slots 54 is arranged to align along the front-rear direction. Each of the upper slots 54 has its longitudinal direction in the front-rear direction. A width of each of the upper connecting portions 56 is smaller than a width of the upper base 50 in the left-right direction. Hereafter, portions of the upper base 50 other than the plurality of upper slots 54 and the upper connecting portions 56 may be referred to as upper bridge portions 58.

The lower blade 10 is arranged below the upper blade 8 and overlaps therewith. The lower blade 10 comprises a lower base 60 and a plurality of lower blade edges 62. The lower base 60 extends in the front-rear direction. The plurality of lower blade edges 62 extends outward from both the right and left edges of the lower base 60. The lower base 60 includes a plurality of lower slots 64 and a plurality of pairs of lower connecting portions 66 each of which is disposed at opposite ends of corresponding one of the lower slots 64. The plurality of lower slots 64 is arranged to align along the front-rear direction. Each of the lower slots 64 has its longitudinal direction in the front-rear direction. A width of each of the lower connecting portions 66 is smaller than a width of the lower base 60 in the left-right direction. Hereafter, portions of the lower base 60 other than the plurality of lower slots 64 and the lower connecting portions 66 may be referred to as lower bridge portions 68.

The gardening trimmer 2 further comprises a sliding plate 74 and a plurality of (six in the present embodiment) guide members 78. The sliding plate 74 is arranged above the upper blade 8 and overlaps therewith. Further, the sliding plate 74 is disposed below the guide bar 6 and overlaps therewith. The sliding plate 74 extends in the front-rear direction. A thickness of the sliding plate 74 in the up-down direction is smaller than each of a thickness of the upper blade 8 in the up-down direction and a thickness of the lower blade 10 in the up-down direction. The sliding plate 74 reduces sliding resistance of the upper blade 8 when the upper blade 8 reciprocates in the front-rear direction.

The guide members 78 guide reciprocating movements of the upper blade 8 and the lower blade 10. Each of the guide members 78 is disposed in one of the upper slots 54 and one of the lower slots 64. Two guide members 78 are coupled to front portions of the guide bar 6 and the housing 12 (see FIG. 2) by first bolts 82. Four guide members 78 are coupled only to the guide bar 6 by second bolts 84 and nuts 86. The guide bar 6, the sliding plate 74, the upper blade 8, and the lower blade 10 are held in the state overlapping with each other in the up-down direction. In this state, a minute gap is provided between the sliding plate 74 and the upper blade 8, and between the upper blade 8 and the lower blade 10.

The gardening trimmer 2 further comprises suppressing structures 90. The suppressing structures 90 are each disposed on the sliding plate 74, the upper blade 8 and the lower blade 10. Hereafter, the suppressing structures 90 disposed on the sliding plate 74 are referred to as first suppressing structures 92, the suppressing structures 90 disposed on the upper blade 8 are referred to as second suppressing structures 94, and the suppressing structures 90 disposed on the lower blade 10 are referred to as third suppressing structures 96.

Figure 6:
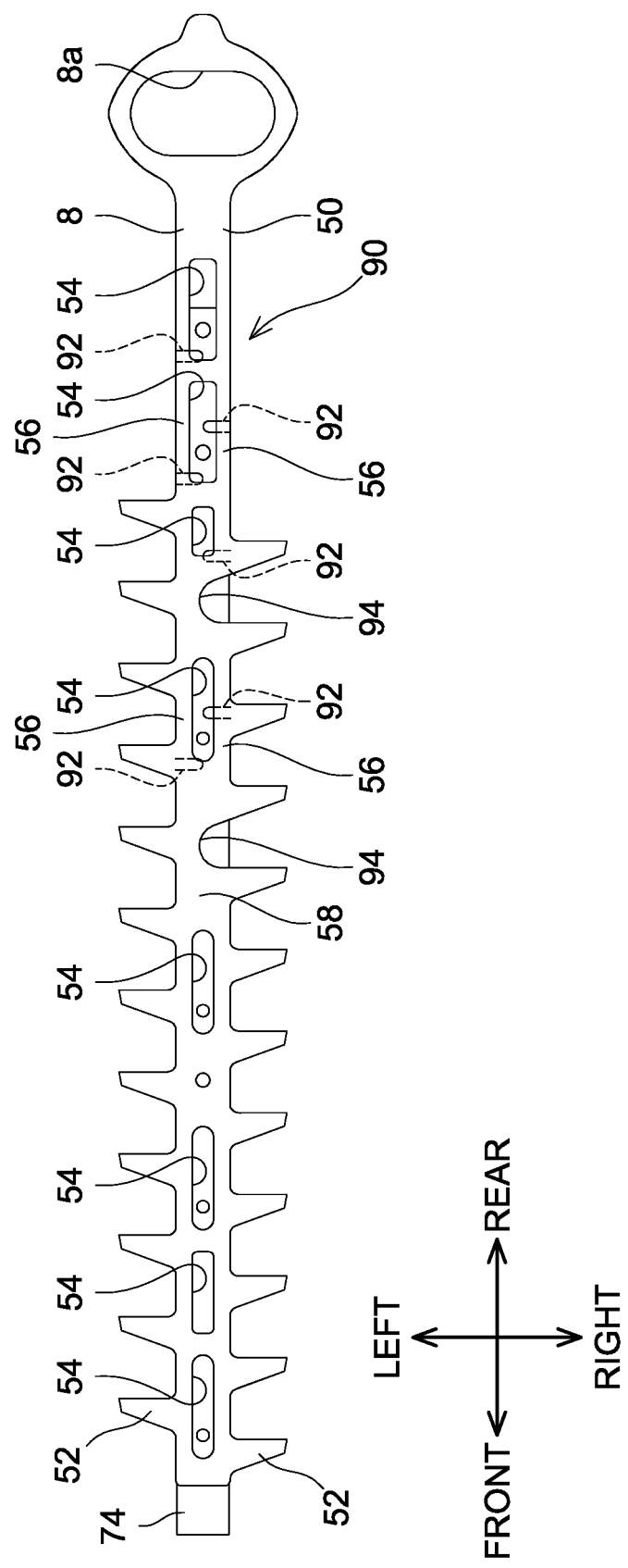
FIG. 6 illustrates the sliding plate 74 and the upper blade 8 of the first embodiment viewed from below.

A plurality of (six in the present embodiment) first suppressing structures 92 is disposed on the sliding plate 74. The six first suppressing structures 92 are disposed on the rear half of the sliding plate 74. The first suppressing structures 92 may be cutouts. The first suppressing structures 92 penetrate the sliding plate 74 in the up-down direction. Three first suppressing structures 92 extend leftward from the right edge of the sliding plate 74. The remaining three first suppressing structures 92 extend rightward from the left edge of the sliding plate 74. The first suppressing structures 92 extend to the vicinity of the center of the width of the sliding plate 74 in the left-right direction. As illustrated in FIG. 6, all the first suppressing structures 92 are disposed at positions constantly facing, in the up-down direction, the upper connecting portions 56 on the upper blade 8 while the upper blade 8 reciprocates. Since the first suppressing structures 92 are not visible under the upper blade 8 in FIG. 6, the first suppressing structures 92 are illustrated in broken lines. For example, the first suppressing structure 92 closest to the rear end of the sliding plate 74 is disposed at a position constantly facing one pair of the upper connecting portions 56 closest to the rear end of the upper blade 8 in the up-down direction while the upper blade 8 reciprocates. Further, all the first suppressing structures 92 move across the upper connecting portions 56 while the upper blade 8 reciprocates.

Figure 7:
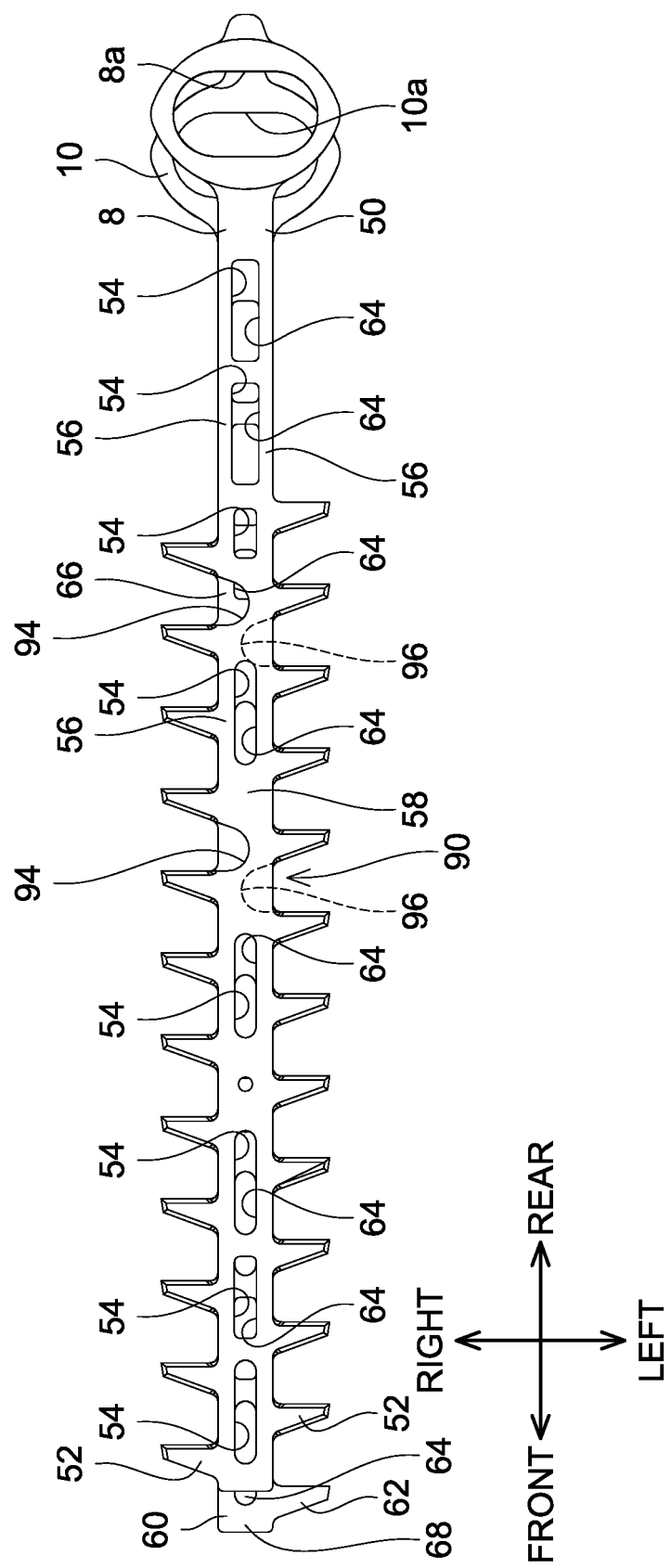
FIG. 7 illustrates the upper blade 8 and the lower blade 10 of the first embodiment viewed from above.

A plurality of (two in the present embodiment) second suppressing structures 94 are disposed on the upper blade 8. The second suppressing structures 94 are for example cutouts. The second suppressing structures 94 are disposed on the upper bridge portions 58. The second suppressing structures 94 penetrate the upper blade 8 in the up-down direction. The second suppressing structures 94 extend leftward from the right end of the upper blade 8. The second suppressing structures 94 extend to the vicinity of the center of the width of the upper blade 8 in the left-right direction. As illustrated in FIG. 7, one of the second suppressing structures 94 on the rear side is disposed at a position facing, in the up-down direction, at least one pair of the lower connecting portions 66 on the lower blade 10 for a certain period within a period required for the upper blade 8 and the lower blade 10 to reciprocate once. One of the second suppressing structures 94 close to the front end is disposed at a position facing, in the up-down direction, at least one of the lower bridge portions 68 on the lower blade 10 for the certain period within the period required for the upper blade 8 and the lower blade 10 to reciprocate once.

Figure 8:
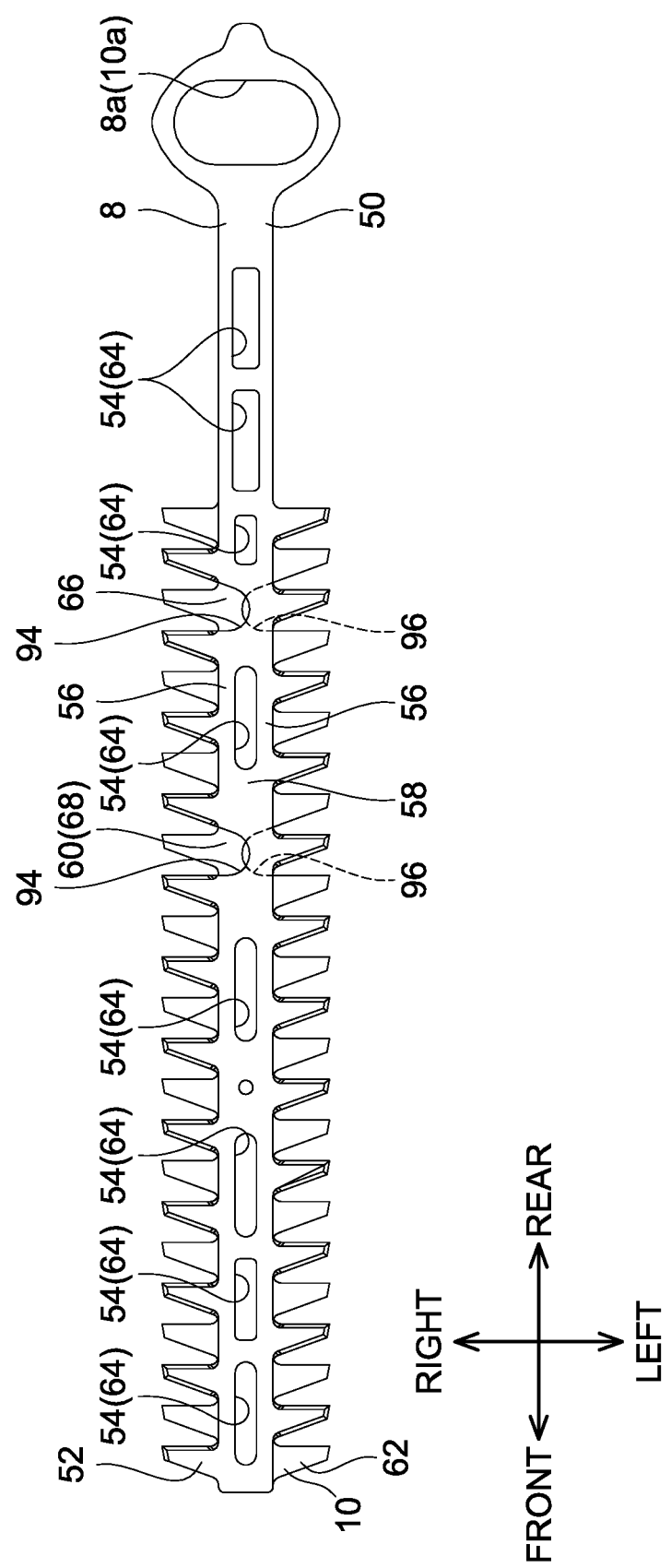
FIG. 8 illustrates the upper blade 8 and the lower blade 10 of the first embodiment viewed from above.

As illustrated in FIG. 5, a plurality of (two in the present embodiment) third suppressing structures 96 is disposed on the lower blade 10. The third suppressing structures 96 are for example cutouts. The third suppressing structures 96 are disposed at the lower bridge portions 68. The third suppressing structures 96 penetrate the lower blade 10 in the up-down direction. The third suppressing structures 96 extend rightward from the left edge of the lower blade 10. The third suppressing structures 96 extend to the vicinity of the center of the width of the lower blade 10 in the left-right direction. As illustrated in FIG. 7, one of the third suppressing structures 96 close to the rear end is disposed at a position facing, in the up-down direction, at least one pair of the upper connecting portions 56 on the upper blade 8 for the certain period within the period required for the upper blade 8 and the lower blade 10 to reciprocate once. One of the third suppressing structures 96 close to the front end is disposed at a position facing, in the up-down direction, at least one of the upper bridge portions 58 on the upper blade 8 for the certain period within the period required for the upper blade 8 and the lower blade 10 to reciprocate once. Further, when the position of the front end of the upper blade 8 and the position of the front end of the lower blade 10 match in the front-rear direction as illustrated in FIG. 8, each of the third suppressing structures 96 is disposed at a position facing corresponding one of the second suppressing structures 94 in the up-down direction.

Next, movement of the grease when the upper blade 8 and the lower blade 10 reciprocate will be described. When the upper blade 8 and the lower blade 10 illustrated in FIG. 2 reciprocate, the upper blade 8 and the lower blade 10 generate heat. The heat generated by the upper blade 8 and the lower blade 10 is transmitted to the conversion mechanism 28, and a temperature of the grease applied to the conversion mechanism 28 increases. Consequently, viscosity of the grease decreases, and fluidity of the grease increases. As the upper blade 8 and the lower blade 10 reciprocate, the grease applied to the conversion mechanism 28 moves to the surfaces of the upper blade 8 and the lower blade 10. Since the minute gap is provided between the sliding plate 74 and the upper blade 8 and between the upper blade 8 and the lower blade 10, the grease enters the minute gap between the sliding plate 74 and the upper blade 8 and between the upper blade 8 and the lower blade 10 due to capillary action.

If the gardening trimmer 2 does not comprise the suppressing structures 90 of the present embodiment, the grease that has entered the minute gap between the sliding plate 74 and the upper blade 8 moves toward the front end of the upper blade 8 due to capillary action. The grease moves to the front end of the upper blade 8 and is disposed across the entirety of the minute gap between the sliding plate 74 and the upper blade 8. The grease that has entered the minute gap between the upper blade 8 and the lower blade 10 moves toward the front ends of the upper blade 8 and the lower blade 10 due to capillary action. The grease moves to the front ends of the upper blade 8 and the lower blade 10, and is provided across the entirety of the minute gap between the upper blade 8 and the lower blade 10. As a result, sliding resistance between the sliding plate 74 and the upper blade 8 and sliding resistance between the upper blade 8 and the lower blade 10 adversely increase.

In the present embodiment, the gardening trimmer 2 comprises the suppressing structures 90. Therefore, how the grease of the present embodiment moves is different from how the grease moves when the gardening trimmer 2 does not comprise the suppressing structures 90. First, how the grease moves between the sliding plate 74 and the upper blade 8 will be explained. All the first suppressing structures 92 are disposed at positions constantly facing the upper connecting portions 56 when the upper blade 8 is reciprocating. Therefore, a gap greater than the minute gap in the up-down direction is provided on each of the upper connecting portions 56. As a result, in this greater space, capillary action tends not to occur, and thus the grease cannot move on the upper connecting portions 56. The grease cannot move between the sliding plate 74 and the upper blade 8 toward the front end of the upper blade 8, and thus remains at the vicinity of the rear end of the upper blade 8. Consequently, as compared to the case in which the grease has moved to the front end of the upper blade 8, increase in the sliding resistance between the sliding plate 74 and the upper blade 8 can be suppressed.

Next, how the grease moves between the upper blade 8 and the lower blade 10 will be explained. As illustrated in FIG. 7, when the second suppressing structure 94 close to the rear end is disposed at a position facing at least one pair of the lower connecting portions 66 and the third suppressing structure 96 close to the rear end is disposed at a position facing at least one pair of the upper connecting portions 56, a gap greater than the minute gap in the up-down direction is provided on the right one of the pair of the lower connecting portions 66 and the left one of the pair of upper connecting portions 56. As a result, in this greater gap, capillary action tends not to occur, and thus the grease cannot move on the right one of the pair of lower connecting portion 66 or the left one of the pair of upper connecting portions 56. Further, as illustrated in FIG. 8, when the second suppressing structures 94 are disposed at positions facing the third suppressing structures 96, a gap greater than the minute gap in the up-down direction is provided on the upper bridge portions 58 and the lower bridge portion 68 in regions where the second suppressing structures 94 and the third suppressing structures 96 face each other. Therefore, in this greater gap, capillary action tends not to occur, and thus the grease cannot move on the upper bridge portions 58 or the lower bridge portions 68. As described above, the grease cannot move toward the front ends of the upper blade 8 and the lower blade 10 between the upper blade 8 and the lower blade 10, and remains at the rear halves of the upper blade 8 and the lower blade 10. Accordingly, as compared to the case in which the grease has moved to the front ends of the upper blade 8 and the lower blade 10, increase in the sliding resistance of the upper blade 8 and the lower blade 10 can be suppressed.

(Effect)

The gardening trimmer 2 of the present embodiment comprises: the electric motor 24; the conversion mechanism 28 configured to convert a rotational movement of the electric motor 24 to a reciprocating movement along the front-rear direction; the upper blade 8 connected to the conversion mechanism 28; and the sliding plate 74 (or the lower blade 8) overlapping with the upper blade 8 in the up-down direction perpendicular to the front-rear direction. The upper blade 8 is configured to reciprocate relative to the sliding plate 74 (or the lower blade 10) along the front-rear direction in conjunction with operation of the conversion mechanism 28. The grease is applied to at least a part of the conversion mechanism 28. The upper blade 8 includes: the plurality of upper slots 54 disposed along the front-rear direction; and the plurality or pairs of upper connecting portions 56, in which each pair of the upper connecting portions 56 is disposed at opposite ends of corresponding one of upper slots 54 in the left-right direction perpendicular to both the front-rear direction and the up-down direction. The gardening trimmer 2 further comprises the suppressing structures 90 configured to suppress the grease from moving toward the front end of the first blade in the front-rear direction. The suppressing structures 90 are disposed on the sliding plate 74 (or the lower blade 10) at the positions facing at least one pair of the upper connecting portions 56 in the up-down direction when the upper blade 8 reciprocates relative to the sliding plate 74 (or the lower blade 10).

In conjunction with the reciprocating movement of the upper blade 8, when the grease enters and attempts to move through the minute gap between the upper blade 8 and the sliding plate 74 (or the lower blade 10) due to capillary action, the grease needs to move on the upper connecting portions 56 of the upper blade 8. In the above configuration, when the upper blade 8 reciprocates relative to the sliding plate 74 (or the lower blade 10), the suppressing structures 90 are disposed at the position facing the upper connecting portions 56. Therefore, even when the grease attempts to move on the upper connecting portions 56 due to capillary action, the grease cannot move any further toward to the front end of the upper blade 8 after it arrives at the positions of the suppressing structures 90. Therefore, the grease is not provided in the minute gap on the front end side of the upper blade 8. Consequently, increase in sliding resistance related to the reciprocating movement of the upper blade 8 can be suppressed.

One of the suppressing structures 90 is disposed on the sliding plate 74 (or the lower blade 10) at the position facing, in the up-down direction, one pair of the upper connecting portions 56 closest to the rear end of the upper blade 8 in the front-rear direction when the upper blade 8 reciprocates relative to the sliding plate (or the lower blade 10).

In the above configuration, at the position closest to the rear end of the upper blade 8, the grease can be suppressed from moving toward the front end of the upper blade 8 from the position closest to the rear end of the upper blade 8. Consequently, an amount of the grease provided in the minute gap between the upper blade 8 and the sliding plate 74 (or the lower blade 10) can be reduced. As a result, increase in the sliding resistance related to the reciprocating movement of the upper blade 8 can be suppressed.

The suppressing structures 90 further comprise the cutouts defined inward from the outer edges of the sliding plate 74 (or the lower blade 10) in the left-right direction and penetrating the sliding plate 74 (or the lower blade 10) in the up-down direction.

In the above configuration, since the cutouts are defined in the sliding plate 74 (or the lower blade 10), the sliding plate 74 (or the lower blade 10) includes the portions that do not face the upper connecting portions 56. Consequently, the grease cannot move on the upper connecting portions 56 toward the front end of the upper blade 8. As a result, by a simple configuration with the cutouts defined in the sliding plate 74 (or the lower blade 10), increase in the sliding resistance related to reciprocating movement of the upper blade 8 can be suppressed.

The suppressing structures 90 are further disposed on the surface of the upper blade 8 facing the sliding plate 74 (or the lower blade 10).

In the above configuration, the grease can be suppressed from moving toward the front end of the upper blade 8 by using the suppressing structures 90 disposed on the sliding plate 74 (or the lower blade 10) and the suppressing structures 90 disposed on the upper blade 8. As a result, increase in the sliding resistance related to reciprocating movement of the upper blade 8 can further be suppressed.

The suppressing structures 90 are disposed on the upper bridge portions 58 of the upper blade 8 other than the upper connecting portions 56.

Since the upper connecting portions 56 are disposed at the opposite ends of the upper slots 54 in the left-right direction, rigidity of the upper connecting portions 56 of the upper blade 8 with respect to the front-rear direction is lower than rigidity of the upper bridge portions 58 on the upper blade 8 except the upper connecting portions 56. Due to this, when the suppressing structures 90 are disposed on the upper connecting portions 56, the upper blade 8 may easily break at the upper connecting portions 56. With the above configuration, since the suppressing structures 90 are disposed on the upper bridge portions 58, breakage of the upper blade 8 at the upper connecting portions 56 can be suppressed as compared to the case in which the suppressing structures 90 are disposed on the upper connecting portions 56 of the upper blade 8.

The sliding plate 74 functions as the facing member and configured to reduce the sliding resistance applied by the reciprocating movement of the upper blade 8.

In the above configuration, since the suppressing structures 90 are disposed on the sliding plate 74, the sliding resistance of the upper blade 8 can be suppressed, and the movement of the grease toward the front end of the upper blade 8 can be suppressed.

The gardening trimmer 2 further comprises the sliding plate 74 overlapping with the upper blade 8 in the up-down direction. The lower blade 10 functions as the facing member. The upper blade 8 and the lower blade 10 are configured to reciprocate relative to the sliding plate 74 along the front-rear direction in conjunction with the operation of the conversion mechanism 28.

In the above configuration, the grease can be suppressed from moving in the minute gap between the upper blade 8 and the lower blade 10 and moving toward the front ends of the upper blade 8 and the lower blade 10. Consequently, increase in the sliding resistance related to the reciprocating movements of the upper blade 8 and the lower blade 10 can be suppressed.

The upper blade 8 includes the plurality of upper blade edges 52 disposed on the opposite outer edges in the left-right direction.

In the above configuration, as compared to the case in which the upper blade edges 52 are disposed only on one outer edge of the upper blade 8 in the left-right direction, maneuverability of the gardening trimmer 2 can be enhanced.

The electric motor 24 functions as a prime mover.

In the above configuration, as compared to the case in which the prime mover is an engine, vibration generated upon operation of the gardening trimmer 2 can be suppressed.

(Corresponding Relationships)

The electric motor 24 is an example of "prime mover". The front-rear direction is an example of "first direction". The up-down direction is an example of "second direction". The left-right direction is an example of "third direction". The sliding plate 74 and the lower blade are examples of "facing member". The upper blade 8 is an example of "first blade". The upper slots 54 are examples of "first slots". The upper connecting portions 56 are examples of "first connecting portions". The upper bridge portions 58 are examples of "a portion of the first blade other than the first connecting portions". The sliding plate 74 is an example of "plate member". The lower blade 10 is an example of "second blade". The upper blade edges 52 are examples of "first blade edges".

Second Embodiment

Figure 9:
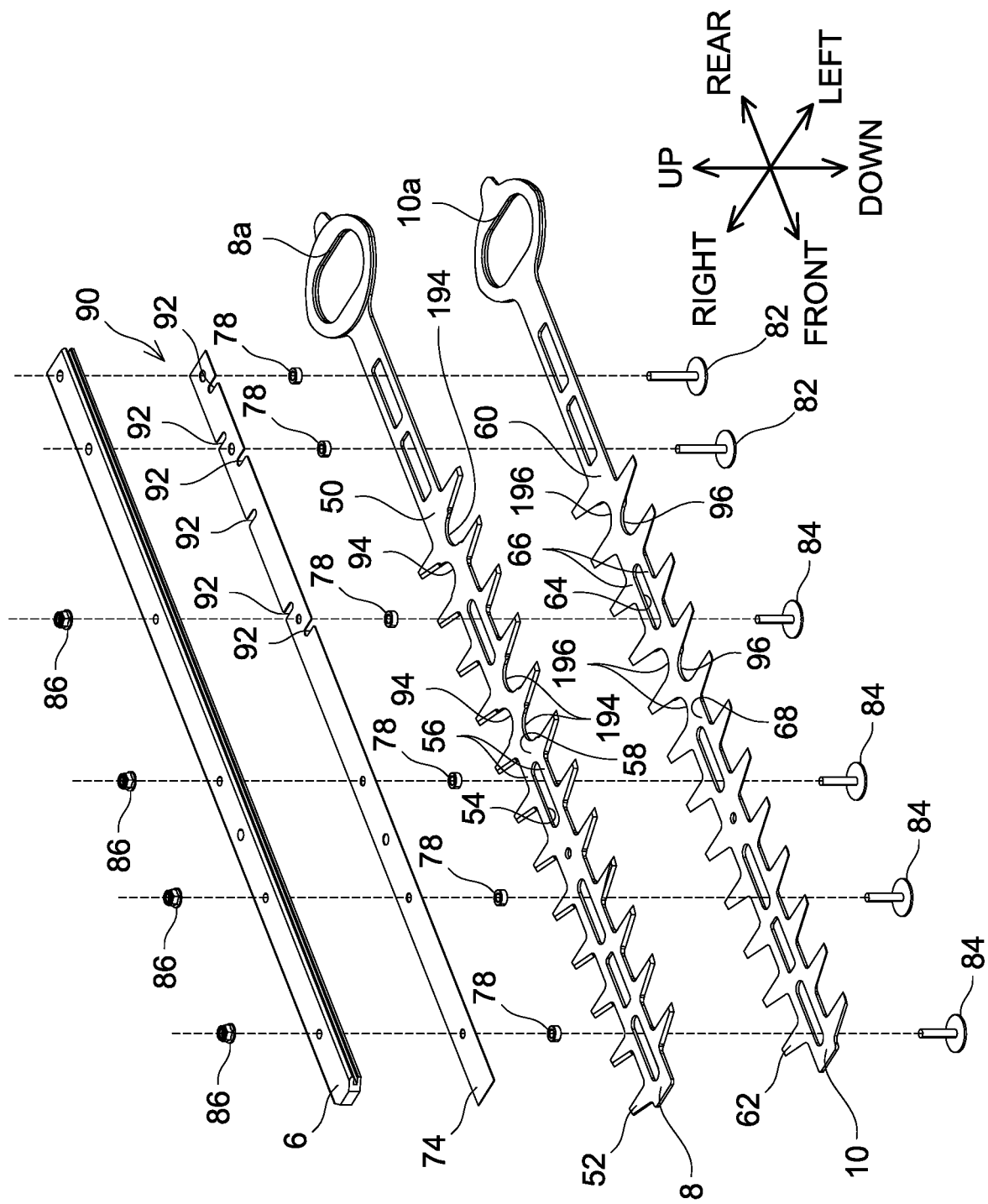
FIG. 9 illustrates exploded perspective views of the guide bar 6, the sliding plate 74, the guide members 78, the upper blade 8, and the lower blade 10 of a second embodiment.

With reference to FIG. 9, a second embodiment will be described. In the second embodiment, points different from the first embodiment will only be described, and like numerals are given to points similar to the first embodiment and explanation thereof will be omitted. In the second embodiment, fourth suppressing structures 194 as well as the second suppressing structures 94 are disposed on the upper blade 8. Further, fifth suppressing structures 196 as well as the third suppressing structures 96 are disposed on the lower blade 10.

The fourth suppressing structures 194 are for example cutouts. The fourth suppressing structures 194 are disposed on the upper bridge portions 58. The fourth suppressing structures 194 extend rightward from the left edge of the upper blade 8. The fourth suppressing structures 194 extend to the vicinity of the center of the width of the upper blade 8 in the left-right direction.

The fifth suppressing structures 196 are for example cutouts. The fifth suppressing structures 196 are disposed on the lower bridge portions 68. The fifth suppressing structures 196 extend leftward from the right edge of the lower blade 10. The fifth suppressing structures 196 extend to the vicinity of the center of the width of the lower blade 10 in the left-right direction. The fifth suppressing structures 196 are disposed at positions facing, in the up-down direction, the fourth suppressing structures 194 for a predetermined period within a period required for the upper blade 8 and the lower blade 10 to reciprocate once. In the present embodiment, as compared to the first embodiment, the grease cannot further move between the upper blade 8 and the lower blade 10 toward the front ends of the upper blade 8 and the lower blade 10, and increase in the sliding resistance of the upper blade 8 and the lower blade 10 can further be suppressed.

Third Embodiment

Figure 10:
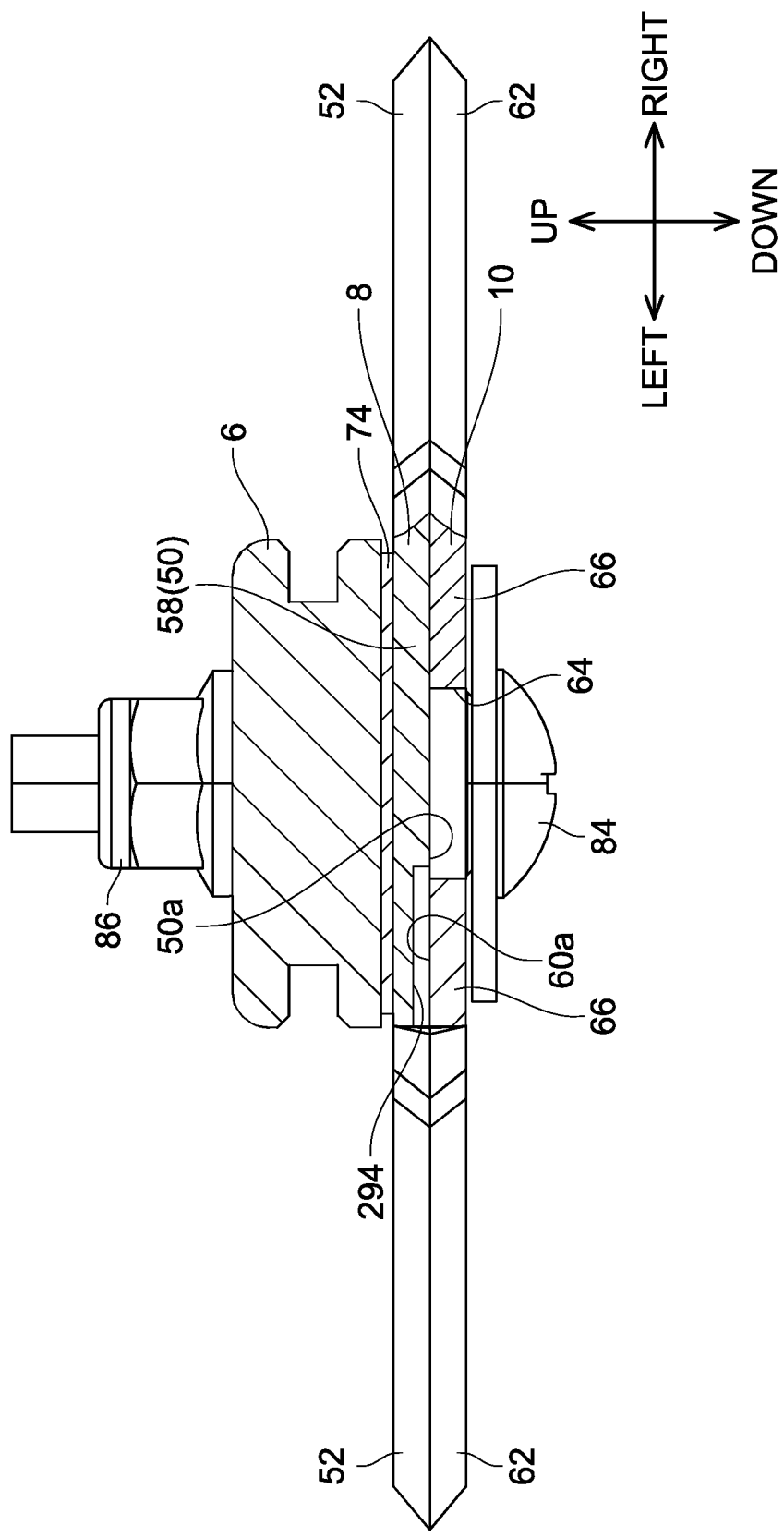
FIG. 10 illustrates vertical cross-sectional views of the guide bar 6, the sliding plate 74, the upper blade 8, and the lower blade 10 of a third embodiment.
Figure 11:
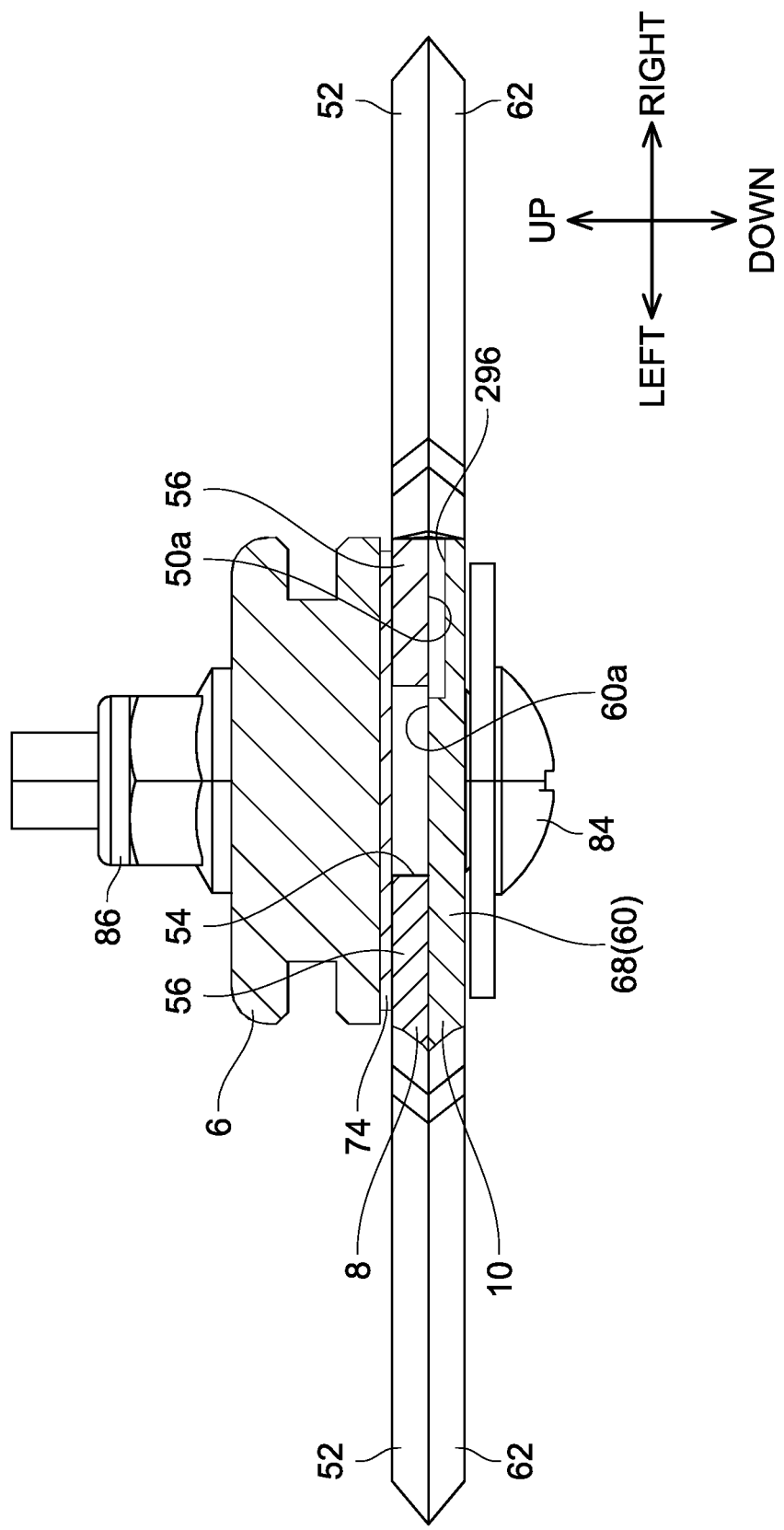
FIG. 11 illustrates the vertical cross-sectional views of the guide bar 6, the sliding plate 74, the upper blade 8, and the lower blade 10 of the third embodiment.

With reference to FIG. 10 and FIG. 11, a third embodiment will be described. In the third embodiment, points different from the first embodiment will only be described, and like numerals are given to points similar to the first embodiment and explanation thereof will be omitted. In the third embodiment, at least a second suppressing structure 294 having a different configuration from the second suppressing structures 94 of the first embodiment is disposed on the upper blade 8. Further, at least a third suppressing structure 296 having a different configuration from the third suppressing structures 96 of the first embodiment is disposed on the lower blade 10.

As illustrated in FIG. 10, the second suppressing structure 294 is for example a groove recessed upward from the lower surface 50a of the upper blade 8. The lower surface 50a of the upper blade 8 faces the upper surface 60a of the lower blade 10. The second suppressing structure 294 is disposed on the upper bridge portion 58. Thickness of a portion of the upper blade 8 in the up-down direction where the second suppressing structure 294 is disposed is smaller than thickness of another portion of the upper blade 8 in the up-down direction. The second suppressing structure 294 is disposed at a position facing, in the up-down direction, a left one of a pair of the lower connecting portions 66. The second suppressing structure 294 extends, in the left-right direction, to a position rightward of the right end of the left one of the pair of the lower connecting portions 66. A gap greater in the up-down direction than the minute gap between the upper blade 8 and the lower blade 10 is provided between the bottom surface of the second suppressing structure 294 and the lower blade 10. Consequently, the grease cannot move on the left one of the pair of the lower connecting portions 66 beyond the second suppressing structure 294 due to capillary action.

As illustrated in FIG. 11, the third suppressing structure 296 is for example a groove recessed downward from the upper surface 60a of the lower blade 10. The third suppressing structure 296 is disposed on the lower bridge portion 68. Thickness of a portion of the lower blade 10 in the up-down direction where the third suppressing structure 296 is disposed is smaller than thickness of another portion of the lower blade 10 in the up-down direction. The third suppressing structure 296 is disposed at a position facing, in the up-down direction, a right one of a pair of the upper connecting portions 56. The third suppressing structure 296 extends, in the left-right direction, to a position leftward of the left end of the right one of the pair of the upper connecting portions 56. A gap greater in the up-down direction than the minute gap between the upper blade 8 and the lower blade 10 is provided between the bottom surface of the third suppressing structure 296 and the upper blade 8. Consequently, the grease cannot move on the left one of the pair of the upper connecting portions 56 beyond the third suppressing structure 296 due to capillary action.
(Effect)

The suppressing structure 296 further comprises the groove disposed on the upper surface 60a of the lower blade 10 that faces the upper blade 8, the groove being recessed inward in the up-down direction from the upper surface 60a.

In the above configuration, since the groove is disposed on the lower blade 10, a distance between the bottom of the groove and the lower surface 50a of the upper blade 8 is greater than height of the gap between the lower blade 10 and the upper blade 8. Consequently, capillary action tends not to occur between the bottom of the groove and the lower surface 50a of the upper blade 8. As a result, by a simple configuration with the groove disposed on the lower blade 10, increase in the sliding resistance related to reciprocating movement of the upper blade 8 can be suppressed.

The suppressing structures 90 of one embodiment may not be limited to cutouts or grooves, and may be another configuration.

The gardening trimmer 2 of one embodiment may not comprise the sliding plate 74. In this case, the suppressing structures 90 may be disposed on the guide bar 6. The guide bar 6 is an example of "facing member".

The suppressing structures 90 of one embodiment may be disposed only on the sliding plate 74. Further, the suppressing structures 90 may be disposed at only one of the upper blade 8 and the lower blade 10.

The upper blade 8 of one embodiment may include the plurality of upper blade edges 52 on only one of its opposite edges in the left-right direction. Further, the lower blade 10 may include the plurality of lower blade edges 62 on only one of its opposite edges in the left-right direction.

The gardening trimmer 2 of one embodiment may comprise an engine instead of the electric motor 24.

The conversion mechanism 28 of one embodiment may employ a cam-crank configuration.

What is claimed is:

1. A gardening trimmer comprising:
a prime mover;
a conversion mechanism comprising a center shaft and configured to convert a rotational movement of the prime mover to a reciprocating movement along a first direction;
a first blade connected to the conversion mechanism; and
a facing member overlapping with the first blade in a second direction perpendicular to the first direction,
wherein
the first blade is configured to reciprocate relative to the facing member along the first direction in conjunction with operation of the conversion mechanism,
grease is applied to at least a part of the conversion mechanism,
the first blade includes:
a plurality of first slots disposed along the first direction; and
a plurality of pairs of first connecting portions, wherein each pair of the first connecting portions is disposed at opposite ends of corresponding one of the first slots in a third direction perpendicular to both the first direction and the second direction,
the gardening trimmer further comprises a suppressing structure configured to suppress the grease from moving toward a front end of the first blade in the first direction, and
the suppressing structure comprises a cutout defined inward from an outer edge of the facing member in the third direction and penetrating the facing member in the second direction from a surface located on one side of the facing member in the second direction to a surface located on another side of the facing member in the second direction, and
a portion of the cutout penetrating in the second direction on the facing member is at a position facing at least one pair of the first connecting portions in the second direction when the first blade reciprocates relative to the facing member.

2. The gardening trimmer according to claim 1, wherein the suppressing structure is disposed on the facing member at a position facing, in the second direction, one pair of the plurality of first connecting portions closest to a rear end of the first blade in the first direction when the first blade reciprocates relative to the facing member.

3. The gardening trimmer according to claim 1, wherein the suppressing structure is further disposed on a surface of the first blade facing the facing member.

4. The gardening trimmer according to claim 3, wherein the suppressing structure is disposed on a portion of the first blade other than the first connecting portions.

5. The gardening trimmer according to claim 1, wherein the facing member comprises a plate member configured to reduce sliding resistance applied by reciprocating movement of the first blade.

6. The gardening trimmer according to claim 1, further comprising a plate member overlapping with the first blade in the second direction,
wherein
the facing member comprises a second blade, and
the first blade and the second blade are configured to reciprocate relative to the plate member along the first direction in conjunction with the operation of the conversion mechanism.

7. The gardening trimmer according to claim 1, wherein the first blade includes a plurality of first blade edges disposed on opposite outer edges in the third direction.

8. The gardening trimmer according to claim 1, wherein the prime mover comprises an electric motor.

9. The gardening trimmer according to claim 1, wherein the suppressing structure is further disposed on a surface of the first blade facing the facing member,
- the suppressing structure is disposed on a portion of the first blade other than the first connecting portions,
- the facing member comprises a plate member configured to reduce sliding resistance applied by reciprocating movement of the first blade,
- the first blade includes a plurality of first blade edges disposed on opposite outer edges in the third direction, and
- the prime mover comprises an electric motor.

\* \* \* \* \*